United States Patent [19]

Manjunath et al.

[11] Patent Number: 5,722,529
[45] Date of Patent: Mar. 3, 1998

[54] DEVICE FOR UNIFORM DRAW-DOWN, HOMOGENIZATION AND CONTINUOUS MIXING OF BULK SOLIDS FROM SILOS AND STOCKPILES

[75] Inventors: Konanur Srikantiah Manjunath, Porsgrunn, Norway; Alan William Roberts, New Lambton Hts., Australia

[73] Assignee: Norsk Hydro A.S., Oslo, Norway

[21] Appl. No.: 532,662

[22] PCT Filed: Feb. 14, 1995

[86] PCT No.: PCT/NO95/00035

§ 371 Date: Dec. 6, 1995

§ 102(e) Date: Dec. 6, 1995

[87] PCT Pub. No.: WO95/21784

PCT Pub. Date: Aug. 17, 1995

[30] Foreign Application Priority Data

Feb. 14, 1994 [NO] Norway ............... 940492

[51] Int. Cl.[6] ............................................. B65G 33/00
[52] U.S. Cl. ............................................. 198/671; 198/670
[58] Field of Search ............................. 198/658, 670, 198/671; 414/310, 319, 326

[56] References Cited

U.S. PATENT DOCUMENTS 1,050,171  1/1913  Riblet .
4,266,902  5/1981  Forsberg .
4,351,627  9/1982  Forsberg .
4,393,609  7/1983  Persson .................. 198/671 X
4,493,442  1/1985  Hanson, Jr. .
4,511,066  4/1985  Forsberg .................. 198/671 X

FOREIGN PATENT DOCUMENTS 1 293 603  10/1972  United Kingdom .
1 456 529  11/1976  United Kingdom .
81/02723   1/1981   WIPO .
90/05766   5/1990   WIPO .

*Primary Examiner*—James R. Bidwell
*Attorney, Agent, or Firm*—Wenderoth, Lind & Ponack

[57] ABSTRACT

A discharge device has an inner tube having an inside and a longitudinal axis. The inner tube is rotatable about the longitudinal axis. A plurality of material inlet openings are distributed along the periphery and length of the inner tube, and a material outlet is at one end. A helical screw flight is attached to the inside of the inner tube for the feed of material from the material inlet openings to the material outlet opening. An outer telescopic tube is disposed around the inner tube, the outer telescopic tube having a plurality of slots therein and being rotatable on the inner tube. The slots, together with the material inlet openings of the inner tube, form inlets for material to enter the inner tube and be fed by the helical screw. The slots are capable of varying the size of the inlets by rotation of the outer telescopic tube relative to the inner tube.

9 Claims, 4 Drawing Sheets

DEVICE FOR UNIFORM DRAW-DOWN, HOMOGENIZATION AND CONTINUOUS MIXING OF BULK SOLIDS FROM SILOS AND STOCKPILES

BACKGROUND OF THE INVENTION

1. Field of the Invention

The present invention relates to a discharge device which works as a feeder for uniform discharge of bulk solids from silos and stockpiles. The device is also designed to work as a homogenizer and a continuous mixer. Due to the versatility of this device with regards to reclaiming solids, it is named "The Universal Feeder".

2. State of the Prior Art

Bulk materials in particulate form such as lumps, granules and powders are an important class of raw materials in the process industry. Handling large quantities of particulate materials requires them to be stored, discharged, and transported to, and often from processing operations.

Such handling operations can affect the quality of the material. There exist a large number of unresolved problems in both ensuring satisfactory filling procedures and complete emptying of silos, as well as ensuring that the material that is discharged has an even quality.

Bulk materials are usually stored in silos and there are many devices to promote the flow of solids in silos and to ensure their discharge. Some of them give rise to mass flow, while others simply promote nearly total discharge. Industry would ideally like to use silos with a high degree of volume utilization. This is realized in the flat bottomed silos.

The most commonly used discharge device for this purpose is the screw feeder. The screw rotates about its own axis, and also sweeps across the entire bottom of the silo. The feeder is thus exposed to the head of solids stored in the silo. There are disadvantages with this device with regard to uniform discharge and high energy consumption. With regard to the consumption of energy in case of flat bottomed silo configurations, it is about 70% more than a tubefeeder. There are also many instances wherein the screw reclaiming in a flat bottomed silo has failed. This is due to a very high torque requirement.

From U.S. Pat. No. 4,351,627, we are aware of a feeding device for discharging bulk solids from silos. This feeder is basically a screw conveyor located inside a tube which has slots. The two units rotate in opposite directions, and the bulk solids feed into the slots uniformly along the tube. The screw conveyor normally rotates faster than the tube. The tube protects the screw which takes care of the horizontal transportation.

The disadvantages of this device are:
high manufacturing costs, and
high installation costs.

The advantages are many, such as:
even quality of the feed,
mass flow in silo, and
controlled segregation A second Swedish patent application, No. 8902138, describes a variable geometry bulk material mixer and feeder. This consists of a tube feeder of the type described previously. It is used in conjunction with long slotted plane flow silos. The silo has partitions and hence can be used to store at least two types of powders. The feasibility of the system was, however, not investigated. Hence, it is difficult to comment on the quality of this device. However, it can be thought that the advantages and disadvantages as previously mentioned hold true in this case as well.

SUMMARY OF THE INVENTION

The object of the invention is to obtain a device for even draw-down of bulk materials stored in plane flow or flat bottomed silos or stockpiles. While being discharged the material should not be crushed or degraded. Another object is to produce a device which can be very energy efficient, relatively simple to construct and cost effective.

The above and other objects of the invention are obtained with a device as described below.

The invention concerns a discharge device having inner and outer tubes with inlet openings/slots for the feed of solids from the silo and an outlet for the same. The inlet openings are distributed over the periphery and along the length of the tube. The inner tube is provided with a helical screw flight attached to its inside. It is rotatable about a longitudinal axis. The screw flight may have a central shaft. The telescopic outer tube with slots can be used to vary the slot size as required by rotating the inner tube. While discharging bulk solids, the outer tube and the inner tube with a helix fixed inside it rotate in the same direction powered by a single motor. The slots of the outer tube my be situated at exactly the same location as the slots on the inner tube, or they can be distributed unevenly and/or with different slot dimensions. The slots can also be provided with slight protusions for digging into solids. The device can be installed at an angle of inclination between 1° and 10°. The device is suitable for example as a homogenizer, continuous mixer, and a device for reclaiming solids from silos and stockpiles.

DESCRIPTION OF THE PREFERRED EMBODIMENTS

Figure 1A:
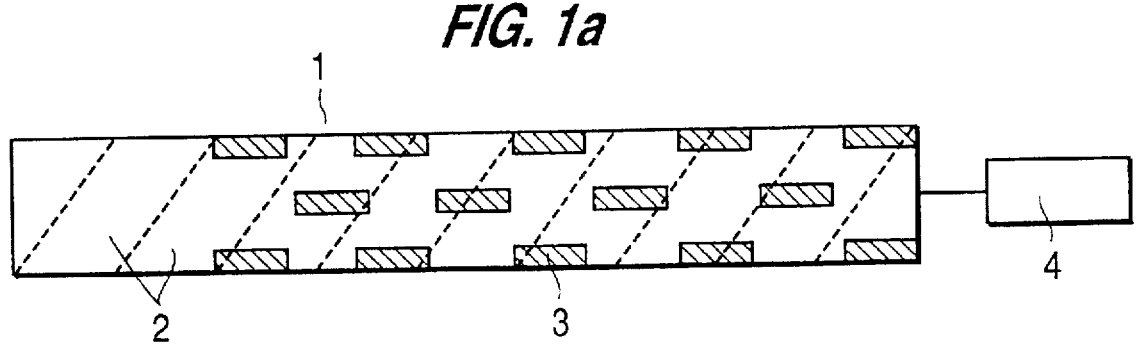
FIGS. 1A illustrates the universal feeder according to the invention, with FIG. 1A showing an inner tube with a fixed screw helix, FIG. 1B showing an outer tube that slides on to the inner tube, and FIG. 1C showing an end view of the universal feeder with the inner tube slipped inside the outer tube.

The device is shown in FIG. 1A, and it consists of a helical screw flight 2 attached to the inside of a tube 1. The helical screw can be a transport or mixing type such as ribbon or paddle design, with or without a central shaft. The screw flights are point welded to the inside of the tube. The tube 1 has slots or activators 3 along its length L. The design of the activators depends on the type of bulk solid handled.

A single motor 4 drives both the screw and the tube in the same direction, unlike the previously described patent on a tubefeeder.

The material, as it enters the tube through the slots, tumbles onto the screw and is transported due to the differential friction between the screw flight, the tube and the bulk solid. Hence, degradation will be negligible when compared to the tubefeeder. The material is transported to the outlet end 5 of the device. The entire feeder shown in FIG. 1A can be slipped into the tube shown in FIG. 1B.

Figure 1B:
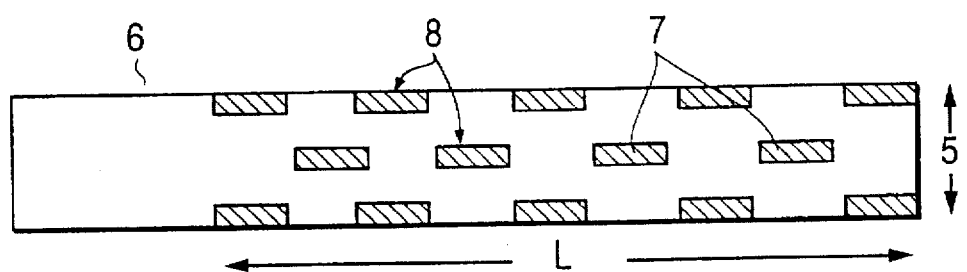
Figure 1C:
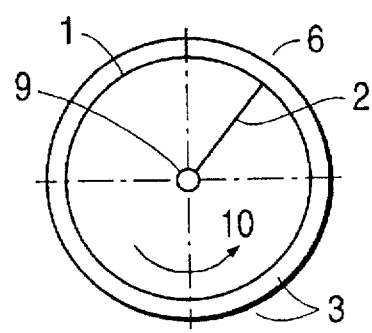

The outer tube 6, as shown in FIG. 1B, is slightly larger in diameter than the inner tube facilitating an easy insertion of the inner tube. The outer tube, has slots 7 which my be of the same dimension and at the same position as the inner tube. If the process demands a change in the capacity of the feed material, this can be accomplished by rotating (as at 8) the outer tube. This will change the size of the activators, and thus changes the capacity accordingly. However, if the process requires a constant feed rate of solids, then the outer tube is only an optional element of the total system. FIG. 1C illustrates an end view of the universal feeder. Note that the central shaft 9 is used to fix the feeder to the silo structure. The direction of rotation 10 of the universal feeder is also illustrated in FIG. 1c.

The diameter of the outer tube is based on the critical outlet width of the plane flow silo. This requires a proper characterization of the material. The knowledge of the flow property of a given bulk solid is essential while dimensioning the slot size. This was never mentioned in the previous patent publications on the tubefeeder, U.S. Pat. No. 4,351, 627 or Swedish patent application No. 8902138.

The universal feeder could be realised as a homogenizer and also a continuous mixer, in addition to discharging solids from silos and stockpiles. The application of this device can be utilized in many powder handling and processing industry such as cement, fertilizers, plastics, large scale chemical, metal, petrochemical, agricultural and pharmaceutical.

We shall describe the important applications of the universal feeder as shown in FIGS. from 2 to 4.

Figure 2A:
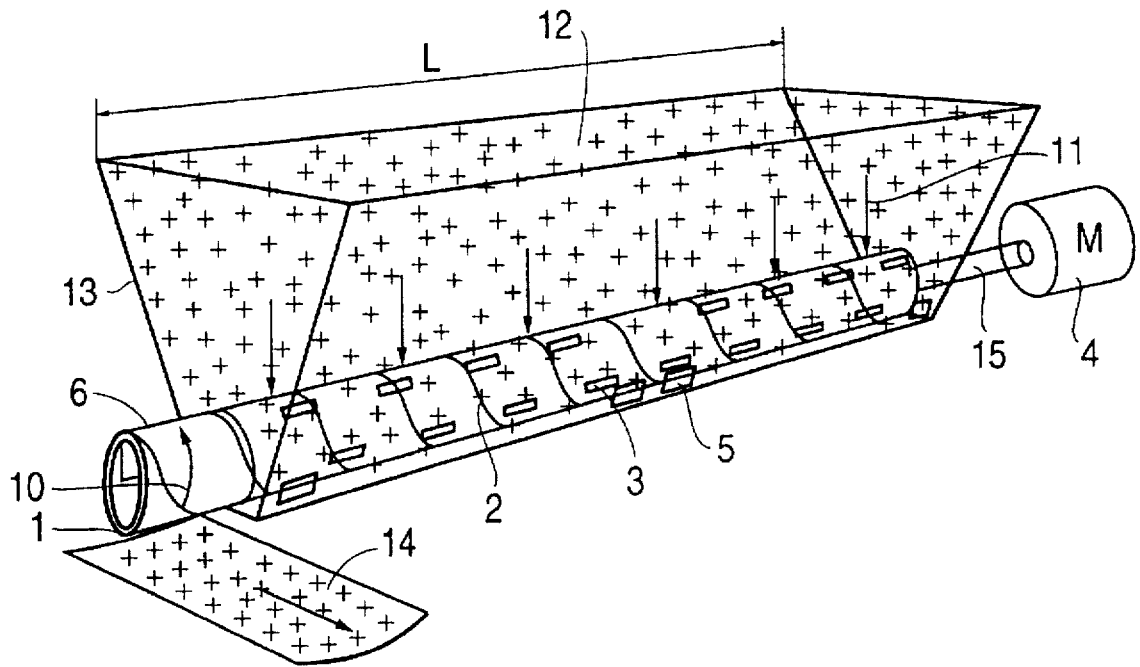
FIGS. 2 show the universal feeder used with long slotted plane flow silos with FIG. 2A showing a homogenizer, FIG. 2B showing a continuous mixer, and FIG. 2C showing transition hoppers.

Referring to FIG. 2A, the universal feeder 1 is located inside a mass flow plane flow silo 13. As described previously, the universal feeder consists of an outer telescopic tube 6 and an inner tube 1 with screw flights attached to the inside of it. Slots or activators 3 are present on both tubes which makes it possible to vary its size by simply rotating the outer tube. The distribution of slots is usually uniform, but if the situation warrants, these slots can be distributed unevenly, allowing different feed capacities from the feeder. The arrangement shown in FIG. 2A will allow for uniform draw-down 11 of solids 12. Preliminary investigation of this type were carried out at the Institute of Bulk Materials Handling Research an the University of Newcastle in Australia. Results indicated that the flow of solids along the entire length of the feeder was constant. The feed rate can be increased by increasing the rotation (10) of the tube. A single drive 4 is sufficient to discharge the material evenly. A connection 15 is arranged between the feeder and the drive. The homogenized powder 14 is discharged from the end of the device. The gap between the outer and the inner tube must be carefully sealed. If the material is changed in the silo, it is required to clean the feeder, and several inspection holes are provided for this purpose. This will avoid contamination problems.

Figure 2B:
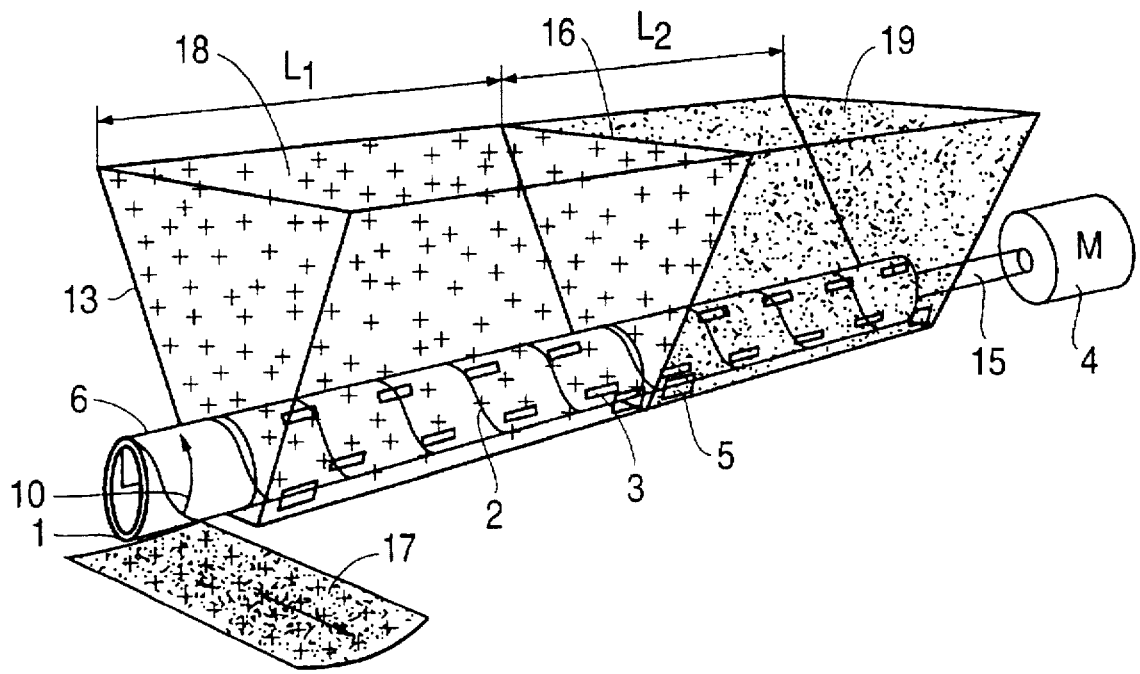

FIG. 2B shows the concept of mixing of solids. The arrangement is exactly the same as shown in FIG. 2A, except for the fact that the silo is now compartmentalized at 16 allowing for the storage of two different types of solids 18 and 19. Using the same feeder, it is now possible have mixed solids upon discharge at 17. The mixing accuracy can only be increased by a suitable mixing screw, such as a paddle screw to mix the solids. Another aspect is the control of solids fed on to the feeder from the silo. This is accomplished by slot dimensions which can be automatically varied by rotating the outer tube. The variation of the slot size can be different in different compartments of the silo. Such an idea was not documented in the previous tubefeeder patent for the mixing of solids, Swedish patent application No. 8902138, thus resulting in a product totally different than what is presented in this application. The mixing ratio can be controlled by the length of the compartments in the silo.

An investigation of this concept was also undertaken at the same time that we tested the arrangement shown in FIG. 2A at the Institute of Bulk Materials Handling Research, Australia. Preliminary results were very promising, indicating that the device can be further developed to accomplish mixing.

Figure 2C:
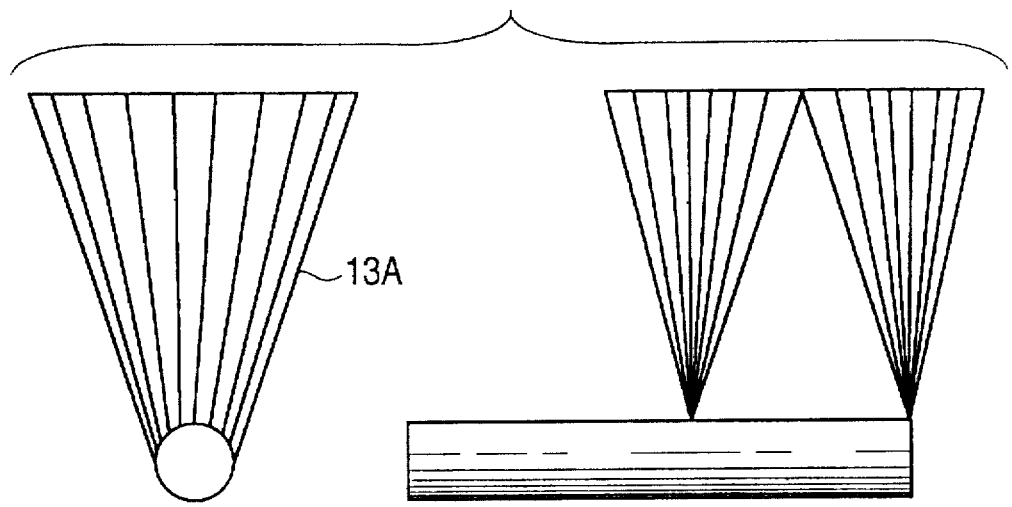

The universal feeder can also be interfaced with silos of conical symmetry, in which case the hopper design is modified into a transition hopper design 13a (refer to FIG. 2C). This design is preferred for most of the difficult to handle types of solids.

Details with regard to the interfacing design is hence minimal as compared with conventional designs.

Figure 3:
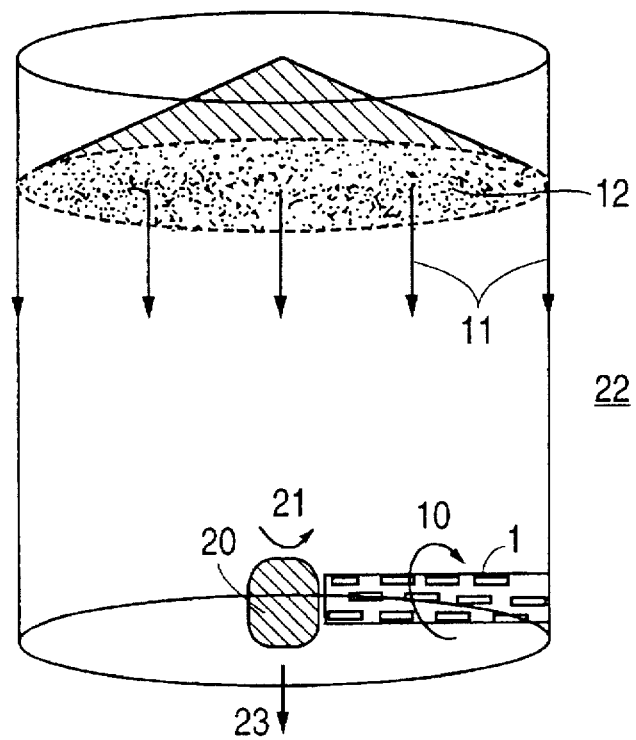
FIG. 3 shows the universal feeder used to reclaim solids from a flat bottomed silo.

FIG. 3 shows another particular application of this invention. The universal feeder 1 is located at the bottom of a flat bottomed silo 22. The discharge of solids occurs centrally at 23.

The parts of the universal feeder are unchanged as compared to the previously described embodiment as shown in FIGS. 1A and 1B. The novel feature of the present design is that the universal feeder can be utilized to reclaim solids 12 uniformly in a flat bottomed silo. The single drive system for the universal feeder is located in the centrally placed dome which is accessible for maintenance. The universal feeder not only rotates at its own axis 10, but also traverses or sweeps (21) across the entire bottom of the silo. The speed of traverse is very low, and a capacity increase can be realized by increasing the rotational speed of the feeder. This type of reclaiming results in not only the total discharge of solids from the flat bottomed silo, but also ensures that the discharged solids have their quality unchanged over time. The advantages also lie in the fact that flat bottomed silos are not only the most volume efficient types of silos, but are also relatively inexpensive when compared to mass flow silos. The present invention makes it possible to compartmentalize the flat bottomed silo, diametrically or concentrically. This will allow the reclaiming of different types of solids that become mixed while being discharged.

Figure 4A:
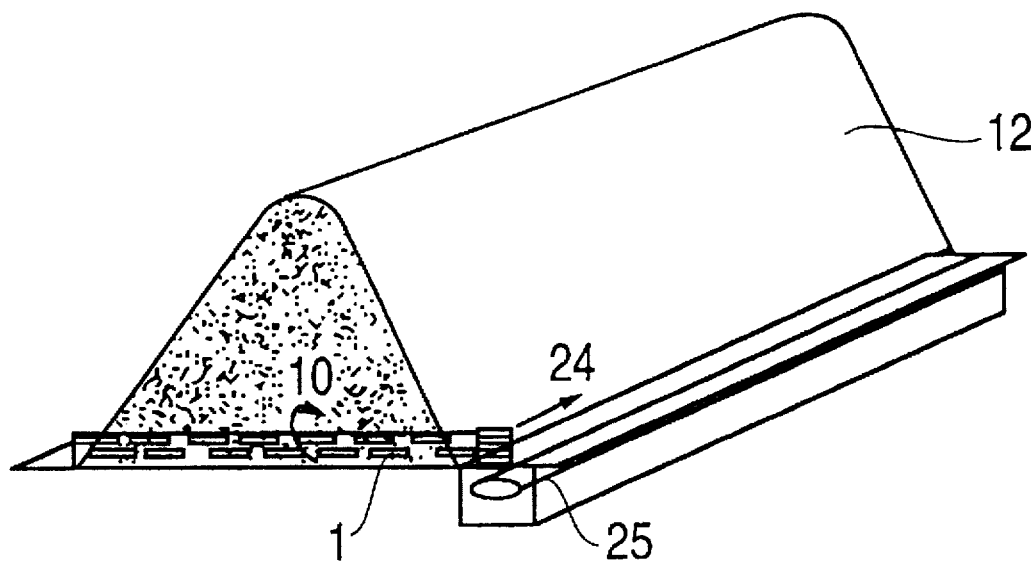
FIGS. 4 shows the universal feeder used to reclaim solids from stockpiles, with FIG. 4A showing longitudinal stockpiles and FIG. 4B showing conical stockpiles.

When it comes to stockpile reclaiming, the universal feeder can be utilized to discharge solids. Consider a longitudinal stockpile as shown in FIG. 4A. The stockpile 12 can be reclaimed evenly using a universal feeder 1. The reclaimed solids are discharged on to a belt conveyor 25. The universal feeder not only rotates an its own axis 10, but also travels along the the length of the stockpile 24.

The material falling through the slots are collected and transported by the helical screw. If the universal feeder is slightly inclined, say about 1° or 2°, this might improve the capacity significantly during situations which do not require careful quality control.

Figure 4B:
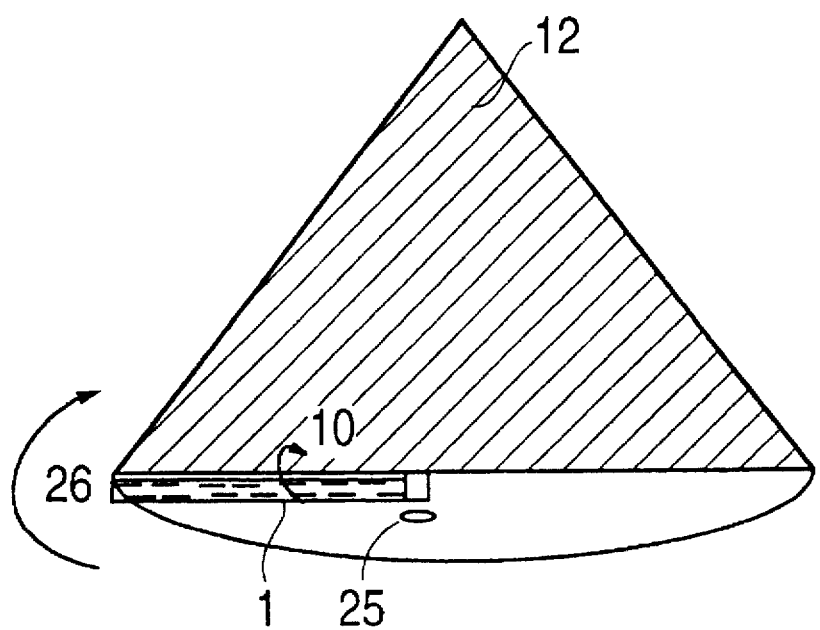

An additional embodiment is shown in FIG. 4B. A conical stockpile is being reclaimed evenly using a universal feeder 1 rotating about its own axis at 10 and sweeping across the entire cross section of the stockpile 26. The material is discharged centrally onto a belt conveyor 25.

Thus the universal feeder can be interfaced with silos of almost any geometry. The details with regard to interfacing are neglegible as compared with conventional feeders such as belt, screw, vibratory, apron, table and chain/link type feeders, etc.

The device also lends itself to easier maintenance and inspection. The outer tube rotation can close the slot width, so that discharge is completely stopped from the silo and the silo is ready for inspection purpose.

It is also possible to use the device in cooling or drying operations.

We claim:

1. A discharge device comprising:

an inner tube having an inside and a longitudinal axis, said inner tube being rotatable about the longitudinal axis, a plurality of material inlet openings distributed along the periphery and along the length of said inner tube, and a material outlet;

a helical screw flight attached to the inside of said inner tube for the feed of material from said material inlet openings to said material outlet opening; and an outer telescopic tube disposed around said inner tube, said outer telescopic tube having a plurality of slots therein and being rotatable on said inner tube, said slots, together with said material inlet openings of said inner tube, forming inlets for material to enter said inner tube and be fed by said helical screw, said slots being capable of varying the size of said inlets by rotation of said outer telescopic tube relative to said inner tube.

2. The device of claim 1, wherein said helical screw flight comprises a central shaft.

3. The device of claim 1, wherein said slots are distributed on said outer telescopic tube so as to be on locations on said outer telescopic tube that are the same as the locations of said material inlet openings in said inner tube.

4. The device of claim 1, wherein said slots are unevenly distributed on said outer telescopic tube.

5. The device of claim 1, wherein said slots have slot dimensions that vary.

6. The device of claim 1, wherein said outer telescopic tube further comprises protrusions for digging into solid materials, said protrusions being provided with said slots.

7. The device of claim 1, wherein a single motor is connected with said helical screw and said inner tube for rotation of said helical screw, said inner tube and said outer tube.

8. The device of claim 1, wherein said inner tube, said helical screw and said outer tube extend at an angle of inclination between 1 degree and 10 degrees.

9. The device of claim 1, wherein said helical screw, said inner tube and said outer tube are rotated together in operation by a motor.

* * * * *